March 27, 1934.　　　G. M. BELLANCA　　　1,952,786
AIRPLANE BAGGAGE COMPARTMENT
Filed July 2, 1931

Inventor
GIUSEPPE M. BELLANCA
By Semmes & Semmes
Attorneys

Patented Mar. 27, 1934

1,952,786

UNITED STATES PATENT OFFICE 1,952,786

AIRPLANE BAGGAGE COMPARTMENT

Giuseppe M. Bellanca, New Castle, Del.

Application July 2, 1931, Serial No. 548,440

1 Claim. (Cl. 244—30)

This invention relates in general to airplanes and more particularly has reference to baggage compartments therefor.

Previous to this time baggage, in passenger carrying airplanes has usually been placed in a compartment in such an airplane, especially provided therefor. Also baggage has been carried in racks provided on the walls of the fuselage above the seats, in the same manner as is customary in train cars.

Both of these methods of transporting baggage in airplanes are attended by disadvantages, which it is the purpose of this invention to overcome. In carrying baggage in a separate compartment usually removed from the center of gravity of an airplane, and in the rear of the passengers, the balance of an airplane is thus disturbed, which is undesirable and the baggage to the rear of the passengers constitutes an added hazard in the event of an accident. Similarly in the provision of wall racks, for carrying baggage, above passengers, the baggage is manifestly a very real hazard and being above the longitudinal line of balance, affects the stability of an airplane.

I propose to provide for carrying baggage beneath the passenger seats, thus distributing the baggage and eliminating the hazard of collectively stored baggage, and in addition to store baggage below the longitudinal line of balance of an airplane with the passengers' weight so as not to detract from the stability of an airplane.

It is an object of my invention therefore, to provide for carrying baggage in a passenger airplane beneath individual passenger seats.

Another object of this invention is to provide an individual baggage compartment beneath the seats in a passenger airplane.

Still another object of this invention is to provide compartments beneath rows of seats in a passenger airplane on each side of a center aisle.

A further object of this invention is to provide an elevated platform in the fuselage of a passenger airplane for mounting seats thereon and carrying baggage thereunder.

A still further object of this invention is to provide a passenger airplane fuselage having elevated platforms on each side for mounting seats thereon and carrying baggage thereunder, on each side of a center aisle.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claim.

In order to make my invention more clearly understood, I have shown, in the accompanying drawing, means for carrying the same into practical effect without limiting the improvements in their useful applications to the particular constructions which, for the purpose of explanation, have been made the subject of illustration.

In the drawing forming a part of this specification:

Figure 1:
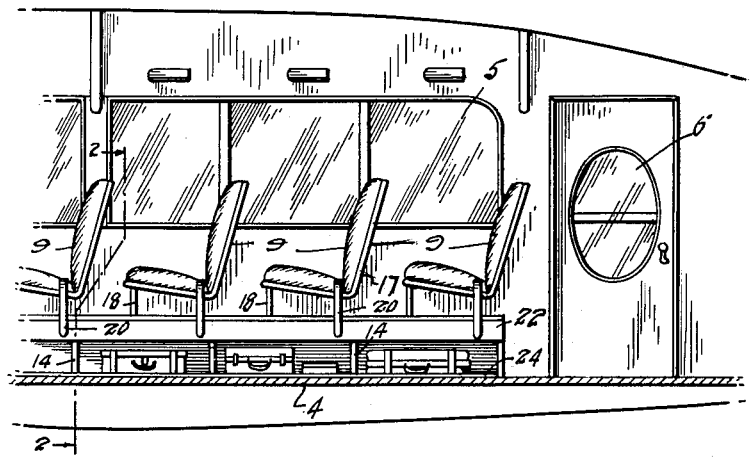
Figure 1 is a sectional fragmentary view from the side of a passenger airplane fuselage showing elevated platforms for mounting seats thereing on and carrying baggage thereunder in accordance with my invention.
Figure 2:
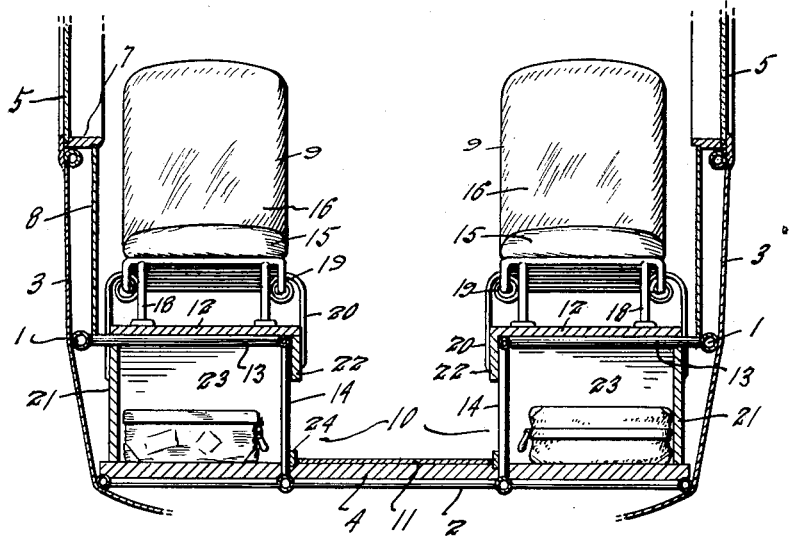
Figure 2 is a sectional view taken on line 2—2 of Figure 1.

Referring more particularly by numerals to the drawing, there is shown a sectional fragmentary view of a passenger airplane fuselage comprising conventional tubular longerons 1 and cross-braces 2, covered with a suitable surfacing material 3 which may be fabric, metal or wood, in the usual manner.

A flooring 4 is fitted on the bottom cross-braces 2 and the surfacing material 3 is interrupted to provide for windows 5 and a door 6.

The windows 5 are provided with ledges 7, and the interior of the cabin is finished with a material 8 which may be of an insulating character, both to protect the cabin against fire and render it sound proof.

In accordance with my invention, I mount seats 9 adjacent each side wall of the fuselage to provide two longitudinally aligned rows of seats and a center aisle 10 which may be carpeted such as with a mat 11.

I mount the seats in each row on platforms 12 elevated above the floor of the fuselage on cross-braces 13, connected at the outer ends to the longerons 1 and at the inner end to the tops of uprights 14, connected at the bottom to the cross-braces 2. The members 13 and 14 are preferably composed of the same material as the longerons and cross-braces, and are of a like character.

The seats 9 comprise cushioned seat and back portions 15 and 16, fitted on an angular frame 17, which may likewise be of the same conformation and composed of the same material as the longerons and cross-braces. The front portions of the seat frames are supported on the tops of uprights 18 mounted at the bottom on the platforms 12. The rear ends of the seat frames are mounted in spring coils 19 on each side, the spring coils terminating in outer downwardly projecting arms 20.

The spring coils 19 are supported by connection of the arms 20 to outer side walls 21 fixed between the platforms and the floor adjacent the walls of the fuselage, and to longitudinal strips 22, fixed to the inner edges of the platforms on the uprights 14.

The rear ends of each of the seats are thus resiliently supported above the platforms. The mounting of the front portions of the seat frames on the uprights 18 is such that the seat frames may pivot at this point.

It will be appreciated from the foregoing description and observed with reference to the drawing, that the platforms 12, elevated from the floor 4 of the fuselage, provide for compartments 23 thereunder, as well as for mounting of the seats 9 thereon.

These compartments provide for the storing of baggage under each seat, thus allowing an even distribution of weight below the passengers, so that the baggage will not constitute a hazard to them, or affect the stability of an airplane, being positioned below the longitudinal line of balance thereof. Longitudinal strips 24 may be provided on the floor 4 of the fuselage adjacent the uprights 14, to prevent baggage placed under the platforms from slipping out into the aisle 10. The arrangement of seats further provides for a center aisle with unrestricted head room allowing the passengers to stand upright and be easily seated by stepping onto the platforms.

There is accomplished by this invention a seating arrangement whereby baggage may be stored under the seats below the longitudinal line of balance of an airplane and the hazard of baggage to passengers thus eliminated, and baggage conveniently stored without affecting the stability of an airplane.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claim.

I claim:

An airplane comprising a fuselage of the cabin type having a series of seats on each side thereof, a continuous flooring member supporting the seats on each side, the flooring members being spaced from the bottom of the fuselage and terminating laterally a predetermined and equal distance from the longitudinal center of the fuselage and defining with the bottom of the cabin a depressed central longitudinal aisle; spaced struts extending between the bottom of the fuselage and the flooring members to support the latter and means cooperating with the struts to retain articles within the open space comprehended between the bottom of the fuselage and the flooring members.

GIUSEPPE M. BELLANCA.